(12) United States Patent
Tan et al.

(10) Patent No.: US 7,111,084 B2
(45) Date of Patent: Sep. 19, 2006

(54) DATA STORAGE NETWORK WITH HOST TRANSPARENT FAILOVER CONTROLLED BY HOST BUS ADAPTER

(75) Inventors: Choon-Seng Tan, Houston, TX (US); Michael D. White, Houston, TX (US); Greg J. Pellegrino, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 630 days.

(21) Appl. No.: 10/035,660

(22) Filed: Dec. 28, 2001

(65) Prior Publication Data

US 2003/0126315 A1 Jul. 3, 2003

(51) Int. Cl.
*G06F 3/00* (2006.01)

(52) U.S. Cl. ............... 710/15; 714/2; 714/4; 714/6; 714/7; 714/8

(58) Field of Classification Search ............... 710/15, 710/17, 18; 714/1, 6; 700/200
See application file for complete search history.

(56) References Cited

U.S. PATENT DOCUMENTS

| | | | |
|---|---|---|---|
| 5,790,775 A | | 8/1998 | Marks et al. |
| 5,944,838 A | * | 8/1999 | Jantz .................... 714/6 |
| 6,006,342 A | | 12/1999 | Beardsley et al. |
| 6,061,750 A | * | 5/2000 | Beardsley et al. ........ 710/74 |
| 6,085,333 A | * | 7/2000 | DeKoning et al. ........ 714/7 |
| 6,192,027 B1 | | 2/2001 | El-Batal |
| 6,202,105 B1 | | 3/2001 | Gates et al. |
| 6,253,288 B1 | * | 6/2001 | McAllister et al. ...... 711/137 |
| 6,279,051 B1 | | 8/2001 | Gates et al. |
| 6,574,687 B1 | * | 6/2003 | Teachout et al. ........ 710/38 |
| 6,578,100 B1 | * | 6/2003 | Ninomiya et al. ........ 710/305 |
| 6,578,158 B1 | * | 6/2003 | Deitz et al. ............. 714/11 |
| 6,601,187 B1 | * | 7/2003 | Sicola et al. ............ 714/6 |
| 6,606,683 B1 | * | 8/2003 | Mori .................... 711/114 |
| 6,625,747 B1 | * | 9/2003 | Tawil et al. ............. 714/6 |
| 6,625,750 B1 | * | 9/2003 | Duso et al. ............. 714/11 |
| 6,658,590 B1 | * | 12/2003 | Sicola et al. ............ 714/6 |
| 6,823,477 B1 | * | 11/2004 | Cheng et al. ............ 714/26 |
| 6,883,065 B1 | * | 4/2005 | Pittelkow et al. ........ 711/114 |
| 6,898,730 B1 | * | 5/2005 | Hanan ................... 714/7 |
| 6,944,133 B1 | * | 9/2005 | Wisner et al. ........... 370/242 |

OTHER PUBLICATIONS

Microsoft Computer Dictionary, 2002, Microsoft Press, Fifth Edition, p. 256.*

* cited by examiner

*Primary Examiner*—Fritz Fleming
*Assistant Examiner*—Niketa Patel

(57) ABSTRACT

A method and host bus adapter for controlling failover and failback processes within a redundant data storage system. The method is carried out by a failover mechanism in a host bus adapter linked to a host server. The system includes a communication fabric providing data paths to pairs of redundant storage controllers managing access to storage devices (such as hard disk drives arranged as RAID). The method includes operating the host bus adapter to detect a failover condition and in response, to match the failover condition to a particular failover action. The failover conditions and corresponding actions are stored in a well-defined rule set accessed by the host bus adapter. The method continues with performing with the host bus adapter the matched failover action. The method is transparent to the host computer device, as the host is not required to participate in the failover processes.

10 Claims, 4 Drawing Sheets

DATA STORAGE NETWORK WITH HOST TRANSPARENT FAILOVER CONTROLLED BY HOST BUS ADAPTER

BACKGROUND OF THE INVENTION

1. Field of the Invention

The present invention relates, in general, to data storage networking technology, and more particularly, to a system and method for controlling failover and failback in a host-transparent fashion within a data storage system by utilizing rule-based firmware in host bus adapters linked to redundant storage controllers.

2. Relevant Background

Storage area networks (SANs) and other data storage systems are revolutionizing how businesses configure and manage data storage. A typical SAN combines server-to-storage architecture and software that allows storage media, such as disk arrays, to be shared by many servers, i.e., host devices, running various operating systems (OS) and software applications. Many of these businesses demand very high data storage availability, which has led to the use of redundant storage media or device such as redundant arrays of inexpensive disks (RAID) and redundant paths from the host server to the data storage. In such data storage systems, the data storage is logically consolidated with high uptime while also reducing costs and infrastructure costs.

A SAN often includes multiple servers or hosts with a central processing unit (CPU) running various operating systems (OS) and including multiple OS device drivers. A host bus adapter (HBA) is provided as an interface between the host CPU and a storage or disk controller. Generally, the host bus adapter is a printed circuit board with firmware adapted to relieve the host of data storage and retrieval tasks and to provide a communication link between the host communication bus and storage network communication fabric (such as Fibre Channel loop or connections). The storage controller performs lower level input/output (I/O) operations for the host and acts as an interface between the host and the physical storage media or devices, which includes providing active and standby paths to the storage devices that are typically identified individually by logical unit numbers (LUNs). To provide ongoing I/O availability and storage redundancy, the storage system must be adapted to address storage controller malfunction, errors in storage devices, and interruptions to or failures in data paths.

The data storage industry has utilized failover and failback processes to enhance controller, storage device, and path failures but has only achieved partial success. Failover is a process in which a first storage controller coupled to a second storage controller assumes the responsibilities of the second controller when the second controller fails (and/or a device or path to the controller fails). Failback is the reverse operation in which the first controller recovers control over its attached storage devices after being repaired or replaced. To achieve failover and failback, control software for storage controllers was typically implemented independently in the different host operating system device drivers, i.e., in host-assisted failover mechanisms.

This has led to a number of problems in common multi-host and multi-operating system environments. Interoperability that enables hosts, storage controllers, and storage devices to be added to a storage system has been difficult because there has not been any standards or failover and failback rules to insure compatibility of systems. For example, a proposal calling for asymmetric commands in the current generation of the small computer system interface architecture (SCSI-3). The proposal provides a model for providing a redundant controller target but does not define host usage. The proposal has not been widely implemented in targets and is not presently implemented in OS drivers, which forces hosts with the problem that controllers not implementing asymmetric commands need to be failed over when implementing this proposal.

Additionally, operating systems often provide hooks for controlling redundancy at improper levels which results in poor error handling and long latencies. Hooks and/or handshaking protocols that are used to allow the host and storage controller to act cooperatively in failover operations are lacking in industry-standard interconnects (such as SCSI-based interconnects, switches, and hubs), and have presently been built into host firmwave via the host device drivers, which has further led to problems as each host and each host OS may implement different hooks and protocols. Many OS models dictate that redundancy control come from components that may introduce undesirable delays and interdependencies.

Hence, there remains a need for an improved system and method for controlling failover and failback processes in a data storage system utilizing redundant storage controllers. Preferably, such a method and system would address the need for compatibility among host, interconnects, and storage controllers by allowing each host operating system to work without any special redundant storage controller's control software being implemented by the host device drivers.

SUMMARY OF THE INVENTION

The present invention addresses the above discussed and additional problems by a data storage system that includes a well-defined set of rules for controlling redundancy processes such as failover (and failback) with an intelligent host bus adapter (HBA) including a failover mechanism. In one embodiment, the HBA is made intelligent by embedding control software for redundant storage controllers in HBA firmware. The HBA of the invention is configured to control failover and other redundancy operations of the system in a manner that is transparent to the host. The HBA manages active and standby paths to redundant storage targets, enables hosts to run numerous operating systems without implementing additional control software via device drivers, provide load distribution and balancing, and provides a single target or LUN entity to upper layer software (e.g., OS device drivers). These and other features of the HBA of the invention are provided, at least in part, by a set of failover processes or functions performed by the HBA based on failover rules.

More particularly, a method is provided of controlling failover and failback processes within a redundant data storage system. The method is preferably carried out by a failover mechanism (such as code embedded in firmware) in a host bus adapter or host adapter that is linked to a host computer device, such as a server. The system further typically includes a communication fabric providing data paths or links to one or more pairs of redundant storage or array controllers (e.g., a pair of controllers designated as an active storage controller and a standby storage controller) managing access to storage devices (such as hard disk drives arranged as RAID). The method includes operating the host bus adapter to detect a failover condition and in response, to match the failover condition to a particular failover action. The failover conditions and corresponding actions are stored in a well-defined rule set accessible to the host bus adapter (such as in local memory). The method continues with performing with the host bus adapter the matched failover action(s). Significantly, the method is transparent to the host computer device, as the host is not required to participate in the failover processes (e.g., no control software needs be loaded onto the host processor). Further, the method is compatible with hosts of varying configuration running various operating system device drivers.

The method is performed to a rule set that facilitates consistent failback and failover processing within the data storage system. The detecting function involves identifying a failure, such as inter-controller link down, active or standby controller failure, or active or standby path failure, and then selecting the failover action from a subset of failover actions particular to the identified failure, i.e., different failover actions are performed based on the type of failure based and are defined in the rule set. Additionally, each failure may have a set of operating conditions and the failover action is selected based on the existing operating condition within the data storage system. The method may also include verifying that the operating environment or circumstances indicate that failover is called for or proper. For example, failover actions may not be performed when an active path fails at a time when all other available paths have also failed or the standby path has previously been marked or flagged as unusable. The method may include performing load distribution of the paths between the host and the data storage devices and preferably, the method includes enforcing anti-thrashing rules to ensure that failover and failback are not performed more than a set number of time within a monitoring interval (e.g., only initiate failover and/or a failback for a particular LUN device or LUN grouping two or three times every 10 to 30 minutes).

DETAILED DESCRIPTION OF THE PREFERRED EMBODIMENTS

The present invention is directed toward a data storage system that utilizes host-transparent or host-agnostic failover processes to monitor and control failover (and failback) of storage controllers and controller pathways. In one embodiment, a failover mechanism (such as code embedded in firmware) is included in host bus adapters (HBAs) provided at each host to create an intelligent adapter or interface between the host (and, more particularly, the host operating system device drivers) and the redundant storage controllers. The following discussion describes in detail particular redundancy environments including a Fibre Channel HBA with failover firmware with redundant storage controllers and storage devices or enclosures (such as the RA4100 available from Compaq Computer Corporation). However, one skilled in the art will readily understood that the features of the intelligent HBA, including the failover rule and action sets, can be applied in many different redundancy environments to nearly any combination of intelligent HBA and array controller communicating over a data communication fabric, bus, or network, such as a Fibre Channel fabric carrying Fibre Channel Protocol (FCP) or a SCSI parallel bus. The following discussion initially provides an overview of the use of intelligent HBAs in data storage systems with reference to FIG. 1 and then progresses to more detailed discussion of features of the invention with reference to FIGS. 2 and 3. The operation of an exemplary intelligent HBA is then described with reference to FIG. 4.

Figure 1:
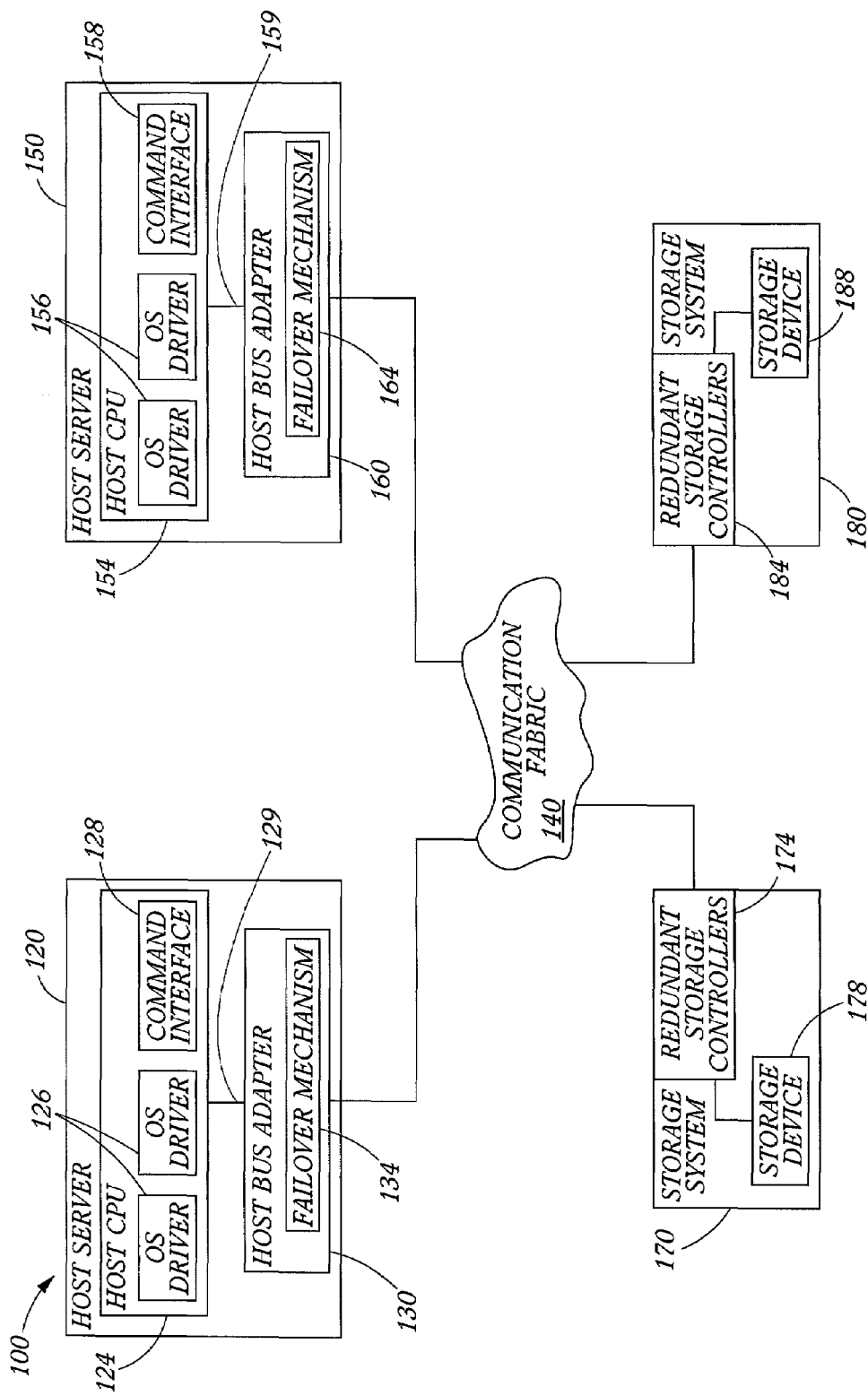
FIG. 1 is an illustration of a data storage system or network according to the present invention illustrating multiple servers with intelligent host bus adapters for managing failover processes of linked redundant storage controllers.

Referring to FIG. 1, a data storage system 100 is provided that utilizes the failover control features of the invention in a multi-host computer device and multi-data storage system environment. As shown, the system 100 includes host servers 120, 150 linked to storage systems 170, 180 via communication fabric 140. The host servers 120, 150 may be heterogeneous, i.e., include processors or CPUs 124, 154 that implement different operating systems (OS) and be produced by different manufacturers. For example, the servers may be NT, Windows, Sun Solaris, or other servers provided by Compaq. Hewlett-Packard, Dell, IBM, Su, and other server or computer device manufacturers and distributors. Significantly, the system 100 is configured to operate compatibly with numerous operating a systems because the operating systems run by the CPU 124, 154 do not need to include array controller commands in software or firmware. As shown, the host CPU 124, 154 includes software modules or OS drivers 126, 156 to implement or provide interpreting and I/O commands for the CPU 124, 154. The CPU 124, 154 further includes a command interface 128, 158, such as an application programming interface (API) for providing an interface between the host CPU 124, 154 and the host bus 129, 159 through which data from the host 120, 150 is transmitted to and from the storage systems 170, 180.

According to an important aspect of the invention, a host bus adapter 130, 160 with a failover mechanism 134, 164 is provided in each host server 120, 150 in the system 100. The host bus adapters 130, 160 are communicatively linked to the host bus 129, 159 and to the communication fabric 140 to act as a communication interface between the host OS device drivers 126, 156 (and/or hosts 120, 150) and the storage systems 170, 180. More importantly, as will be discussed in detail, each host bus adapter 130, 160 includes in firmware or otherwise a failover mechanism 134, 164 that monitors the communication fabric 140 for indications or conditions that a failover condition may be present in the system 100. The failover mechanism 134, 164 then acts according to a set of failover rules to initiate (under proper conditions and operation circumstances) failure without requiring action by the host CPU 124, 154. In other words, the failover process is controlled by the host bus adapters 130, 160 in a manner that is transparent to the host CPUs 124, 154.

Typically, the host bus adapters 130, 160 include a printed circuit board that can be inserted or included in the host server 120, 150 and connected to the communication fabric 140 and the board will include devices for storing the failover mechanism 134, 164 are firmware and processing devices for implementing the firmware. The host bus adapter 130, 160 with failover mechanism 134, 164 is adapted to provide the same interface to each OS driver 126, 156 without the OS driver 126, 156 being aware of the different redundant hardware within the storage systems 170, 180. The host bus adapter 130, 160 functions to give the host OS drivers 126, 156 a consistent logical view across many target platforms. Additionally, the failover mechanisms 134, 164 may, in some embodiments, support server clustering. In these embodiments, the failover mechanisms 134, 164 would be able to track SCSI or other reservations between the host 120, 150 and target devices or LUNs. Preferably, the reservation is preserved when switching from one initiator port (e.g., a Fibre port) to another.

Generally, the failover mechanisms 134, 164 operate to simplify the host CPU 124, 154 support of redundant target controllers 174, 184. As will be discussed with reference to FIG. 4, the failover mechanism 134, 164 provide management over all target device communication paths including setting initial paths (based on set preferred paths, based on load distribution, and the like) and switching from active to standby controllers when failover conditions are identified. Additional operating systems and OS drivers 126, 156 can readily be added to the system 100 as each will be provided the same redundancy support model and interface by the failover mechanism 134, 164. The host bus adapters 130, 160 further eliminate the need for filter drivers, which have traditionally been difficult to develop causing delays in product completion and shipment.

The communication fabric 140 may include a number of devices and utilize various communication protocols useful for communicatively linking servers, storage system devices such as controllers, and other electronic devices. For example, the communication fabric 140 may include a Fibre Channel (FC) loop with hub, switches, and FCP-compliant devices. The communication fabric 140 may also be adapted to carry data and commands per other various well-known protocols, such as the SCSI standard architecture, and include devices selected to support such protocols. One embodiment of the invention utilizes a Fibre Channel interconnect or fabric but this is not a requirement for operation of the host bus adapters 130, 160.

The storage systems 170, 180 are linked to the communication fabric 140 for communicating with the host bus adapters 130, 160 (such as to allow monitoring of controller availability and to allow application, environment, and other data to be passed to and from the host servers 120, 150 to the storage systems 170, 180). The storage systems 170, 180 may take numerous forms and arrangements to practice the invention but typically will take on environments and arrangements found in redundant storage environments such as storage area networks (SANs) and the like. The storage systems 170, 180 each include redundant storage controllers 174, 184, such as two or more array controllers, and storage devices, such as hard disk arrays arranged as RAID.

The storage controllers 174, 184 may take on numerous forms but generally function to control data input and output from the storage devices 178, 188 and to monitor their operation such as by collecting environment information. The storage devices 178, 188 often take the form of a plurality of hard disk drives that are typically placed in enclosures and/or cabinets. Redundancy is provided in each storage system 170, 180 by having an active and standby storage controller in the controllers 174, 184 with access to the storage devices 178, 188 and, further, portions of the storage devices 178, 188 may include copies or backups of other active portions of the storage devices 178, 188. Individual devices in the storage devices 178, 188 are typically identified with unique logical unit numbers (LUNs) to enable the controllers 174, 184 (and host bus adapters 130, 160) to be able to route and retrieve information from specific ones of the storage devices.

During operation of the system 100, the failover mechanisms 134, 164 act in combination with the host command interfaces 128, 158 to provide information to the hosts 120, 150 while allowing failover management to be hidden from the host CPU 124, 154. The failover mechanism 134, 164 supports a number of redundancy API commands including the uncover command, the get bus info command, the get device unique IDs command, and the get device state info command. Generally, by default, the host bus adapter 130, 160 will come up in or initiate in a cover mode or failover mechanism active mode. The uncover command is used to disable the cover mode or to place the failover mechanism in the inactive mode. The uncover command may be useful when there is a redundancy agent available and present in upper layer software (such as the OS drivers 126, 156), and, in some embodiments, the uncover command is not reversible. The get bus info command is useful for providing the host CPU 124, 154 with a statistic link status counter. The get device unique IDs command provides the host CPU 124, 154 with the unique ID (such as a LUN) associated with a logical device. The get device state info command provides the host CPU 124, 154 with path status, target device status, and logical group ID information (e.g., LUN grouping of storage devices explained below).

The failover mechanism 134, 164 functions as an event notifier for the command interface 128, 158. Events in the system 100 are communicated to the host CPU 124, 154 when path status changes are identified by the host bus adapter 120, 160, e.g., path failed, path degraded, path okay, and the like. Events are communicated also when logical and/or physical device changes are identified by the host bus adapter 130, 160, e.g., remote controller 174, 184 failed, logical driver failure, and the like. The host bus adapters 130, 160 may further function to provide command and/or SCSI status to the command interface 128, 158 such as providing error conditions upon predetermined conditions such as device failure (e.g., returned upon a logical drive failure) and path failure (i.e., returned when all paths to a device are detected as failed).

Figure 2:
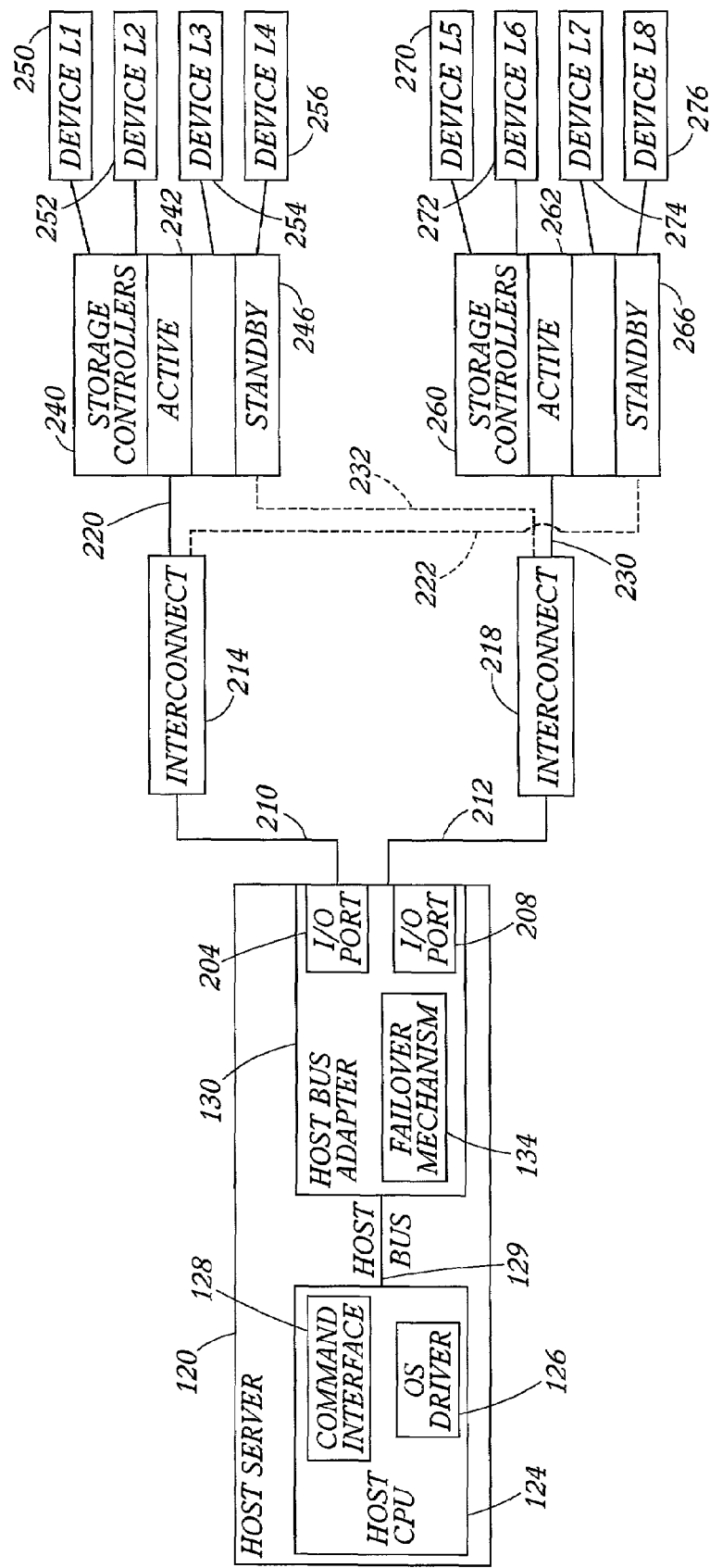
FIG. 2 is a simplified block diagram illustrating more detail of an exemplary host bus adapter for FIG. 1 illustrating load distribution to two storage subsystem devices, such as RAID enclosures.

FIG. 2 further illustrates features of the data storage system 100 and is particularly useful for discussing load distribution provided by the host bus adapted 130, 160. As shown, only one host bus adapter 130 is needed for each host server 120 to provide the features of the invention. The host bus adapter 130 may be a single channel device with and I/O port or as shown, be a dual channel device with two I/O ports 204, 208. Typically, the host bus adapter 130 is configured for installation in a PCI or other slot in the server 120 and includes 32-bit, 64-bit, or larger connectors and converters (such as GBIC converters) for converting electrical signals to Fibre Channel (FC) to be sent on FC cables 210, 212 to interconnects 214, 218. The interconnect 214, 218 is typically a hub, a switch (such as an FC-AL or SAN switch), or fabric device and preferably supports ready interconnection between single I/O ports 204, 208 and multiple storage controllers 240, 260. Cables or paths (such as FC cable) 220, 222, 230, 232 provide a communication path between the interconnects 214, 218 and the storage controllers 240, 260.

The storage controllers 240, 260 include at least one active controller 242, 262 and typically include a standby controller 246, 266 (although this is not required in all embodiments). the controllers 242, 246, 262, 266 generally provide multiple data paths to the storage devices 250, 252, 254, 256, 270, 272, 274, 276 and allow dynamic allocation and access control of data (e.g., to the logical volume level).

The storage devices 250, 252, 254, 255, 270, 272, 274, 276 are often housed in an enclosure and although 4 storage devices are shown for each set of storage controllers 240, 260, many more devices can be included in the system 100 (for example, common enclosures utilized in RAID arrays and SAN systems include 12 or more disk drive devices). As shown, the host bus adapter 130 is connected to both the active and standby controller 242, 246, 262, 266 ports (if present).

The failover mechanism 134 of the host bus adapter 130 is preferably adapted to support at least static load distribution within the system 100. Generally, load distribution functions are carried out when there is no "preferred" target controller set within the storage subsystem controlled by the storage controllers 240 or 260. Preferred target controllers (e.g., a controller that is to be used first within a storage subsystem prior to more evenly distributing load) are set, and this information is stored by the host bus adapted 130 for use in later operations. The illustrated configuration is shown after static load balancing operations with a default path from a host served by host bus adapter 130 to devices L1, L2, L3, L4 (250, 252, 254, 256) being path 210 to interconnect 214 to path 220 to active controller 242. A balanced configuration for host bus adapter 130 to devices L5, L6, L7, L8 (270, 272, 274, 276) is path 212 to interconnect 218 then path 230 to active controller 262. Prior to load distribution or balancing by the host bus adapter 130, both sets of devices may have been accessed through a single one of the interconnects 214, 218. Hence, the intelligent bus adapter 130 provides at least periodic data distribution or balancing to control latencies and bottlenecks at interconnects 214, 218 or elsewhere in the communication fabric.

Figure 3:
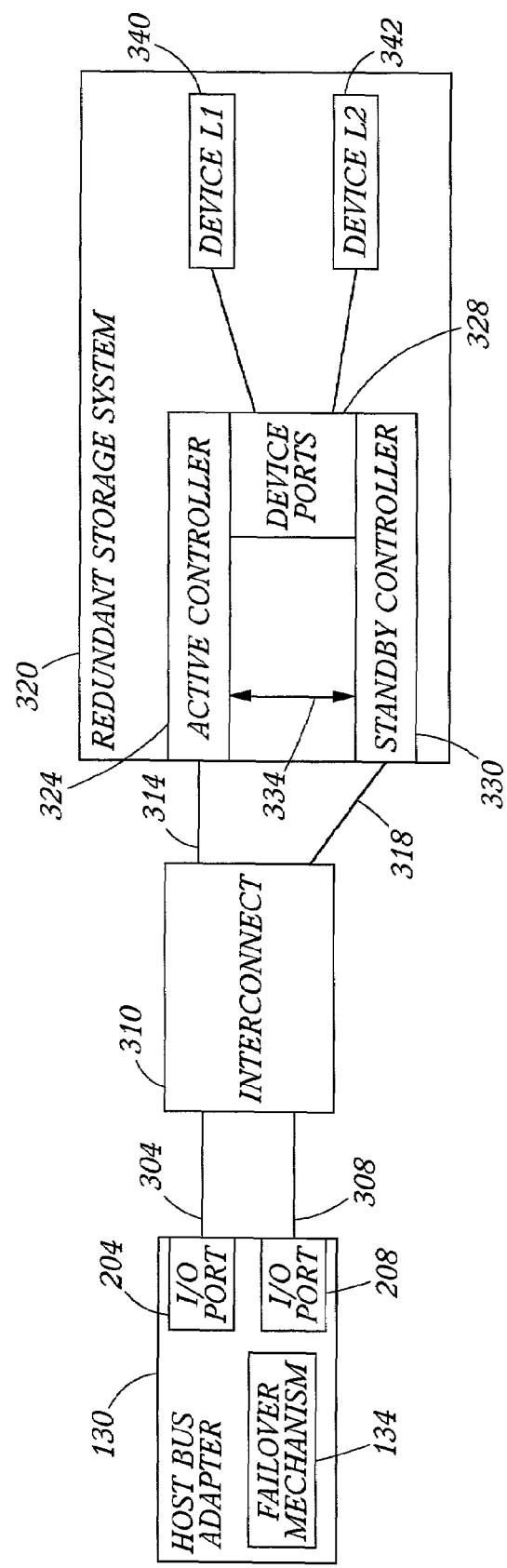
FIG. 3 is another block diagram useful for describing the operation of the host bus adapter in presenting single logical unit numbers (LUNs) and paths to a host to simplify host processing.

FIG. 3 further illustrates details of useful elements of the data storage system of FIG. 1 and is useful for stressing that the host bus adapter 130 is uniquely adapted to simplify operation of a host device. In this regard, the failover mechanism 134 or other firmware or devices in the adapter 130 is configured to present a single LUN entity to upper layer software running in the host (such as OS device drivers). Only one LUN or device identification is provided regardless of the number of reachable paths to storage devices presently existing in the system 100. The single LUN entity presented to the host of devices will be discovered multiple times because of the redundant controllers and redundant paths.

As shown, the host bus adapter 130 is linked to the active controller 324 in the redundant storage system 320 by link 304, interconnect 310, and link 314 and to standby controller 330 by link 308, interconnect 310, and link 318. Again, the links 304, 308, 314, and 318 may be any of a number of useful communication links (such as those configured to carry SCSI and data configured to comply with other protocols) and the interconnect 310 is a hub, switch or other device compatible with the links 304, 308, 314, 318. The redundant storage system 320 includes storage devices 340, 342 linked to the device ports 328 (such as SCSI device ports) that are shared by the controllers 324, 330. The controllers 324, 330 further are in communication via bus or inter-controller link (ICL) 334.

All the paths between the host bus adapter 130 and the devices 340, 342 are abstracted from the host drivers serviced by the host bus adapter 130 (but not shown in FIG. 3), and a single LUN element is presented to the host drivers when the host bus adapter 130 is operating in "covered" or "active" mode. In the example shown in FIG. 3, four potential paths for all the LUNs can be identified (i.e., 2 host bus adapter busses 304, 308 and 2 remote controllers 324, 330 leads to 4 paths). More specifically, the paths include: I/O port 204 to active controller 324; I/O port 204 to standby controller 330; I/O port 208 to active controller 324; and I/O port 208 to standby controller 330. In operation, the host bus adapter 130 only presents one of these at a time to a host OS driver.

According to another aspect of the present invention, the host bus adapters 130, 160 are configured to support target grouping of storage devices and redundancy of groups of devices. In one embodiment, the failover mechanisms 134, 164 support target LUN grouping processes by failing over all the LUNs belonging to a group when it is determined that one or more of the LUNs in the group needs to be failed over. Grouping may be achieved in a number of acceptable fashions such as by assigning a group ID (such as a 4-byte group ID) to each grouped device. Grouping may be done based on type of controller, controller configuration, of other useful criteria. If failover is determined appropriate by the failover mechanism 134, 164 for a device, the mechanism 134, 164 determines if the device is grouped (e.g., has a valid group ID), the mechanism 134, 164 will identify other devices having an identical group ID and failover these devices.

Figure 4:
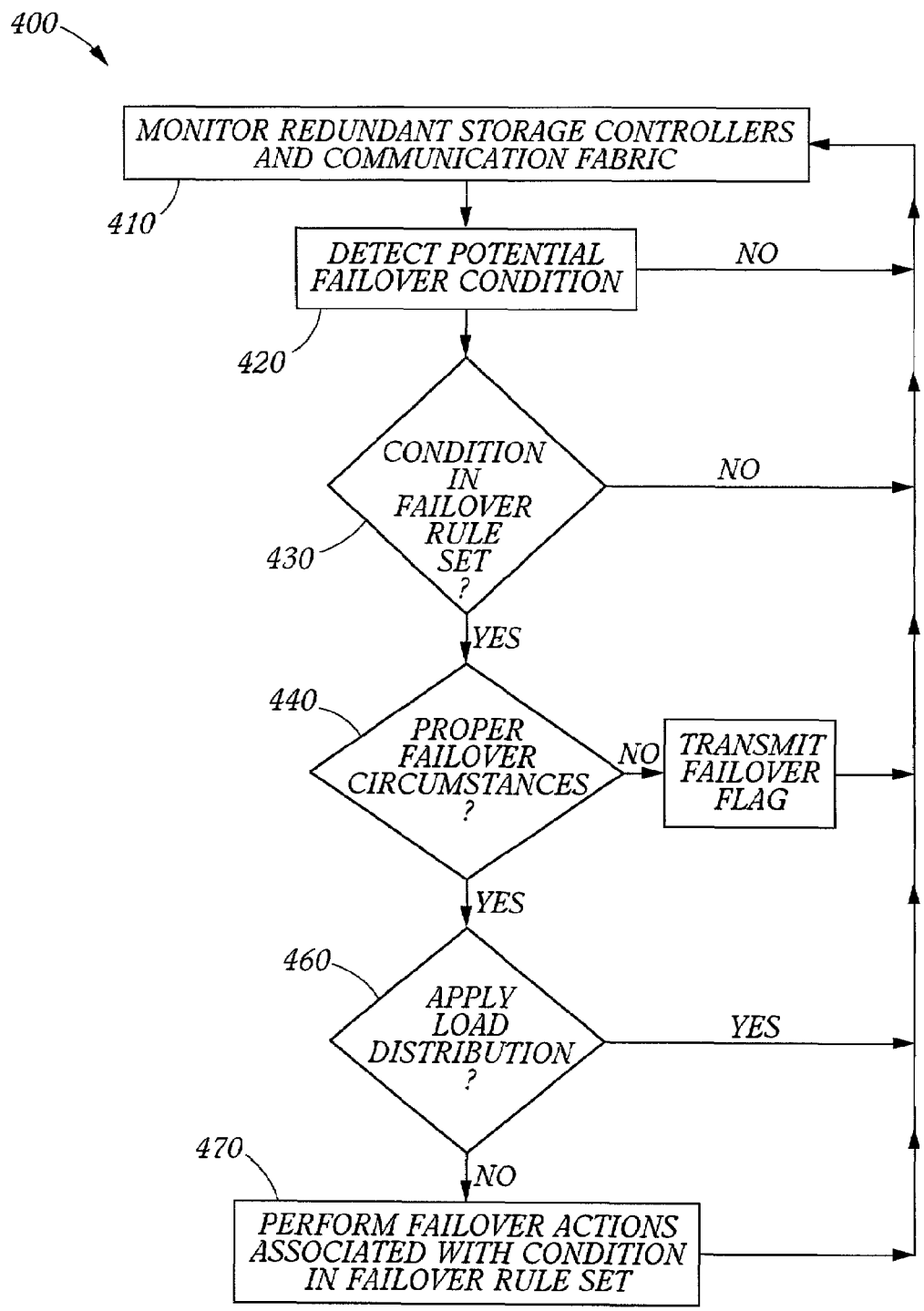
FIG. 4 is a flow chart illustrating operation of the host bus adapters of FIG. 1 in detecting and controlling failover of redundant storage controllers in a manner that is transparent to the host.

FIG. 4 illustrates an exemplary failover control process 400 carried out by the failover mechanism 134, 164 of the data storage system 100 of FIG. 1. As discussed with reference to FIGS. 1–3, the host bus adapters 130, 160 are communicatively linked to the redundant storage controllers 174, 184 for passing data from the hosts 120, 150 to storage devices 178, 188 and for receiving information from the controllers 174, 184 and monitoring communication fabric 140 devices and pathways. The control process 400 begins at 410 with monitoring the redundant storage controllers and communication fabric for failover conditions and for other operating parameters. In the case where there is no active path found for a logical volume or LUN during monitoring, e.g., discovery operations, the first command addressed to that logical volume or device would create a failover condition.

Monitoring 410 may include performing path verification periodically (e.g., path monitoring time interval of about 1 to 10 seconds or more and more preferably, about every 5 seconds) for each target redundant controller. The monitoring 410 by the failover mechanisms preferably includes monitoring all standby paths within the path monitoring time interval to make sure it is available or "safe" to failover when the path is needed. Path verification in monitoring 410 also occurs when command timeouts are received by the failover mechanisms.

In many embodiments, the failover control process 400 supports the establishment of preferred paths to target controllers from hosts. In these embodiments, automated failback in the process 400 is typically allowed only when a preferred path is set for a particular logical unit or storage subsystem. The preferred path is generally established or set as a part of the redundant controllers control parameters communicated to the failover mechanism and may be set for particular controllers, storage devices or groups, or storage subsystems.

The control process 400 continues at 420 with the detection by the failover mechanism of a potential failover condition. The detection 420 may include receiving an event notification over the communication fabric, sensing redundant parameters, receiving a command timeout, failure to verify an active path, receiving a target controller logout, or receiving other signals or test results. The detection typically also includes specific condition information indicating the operating status of the active and standby controllers and/or the communication path. Alternatively, the condition information for the system being monitored and controlled by the failover mechanism is retrieved by the failover mechanism at 420. At 430, the process 400 continues with determining if the condition exists as a valid failover condition within a predetermined failover condition set. Typically, the failover mechanism will perform a comparison or lookup of the detected condition with the failover set, which is preferably stored in local memory in the host bus adapter (but may be stored in memory linked to the host bus adapter). If the condition is not found within the failover condition set, monitoring is renewed at 410 and no failover is initiated for the detected condition.

At 440 for valid conditions, the process 400 continues with determination of whether the proper operating circumstances are present within the system monitored by the failover mechanism for failover. Again, typically a lookup or comparison is performed by the failover mechanism to determine if failover is proper at the time of the condition detection (e.g., comparison with a set of predetermined failback circumstances stored in local host bus adapter memory). If the circumstances are not proper, an optional step 450 is performed to transmit a failover or warning flag to the host or to store such a flag (such as in a counter device) to thereby monitor operation of the data storage system. Monitoring is continued at 410.

Numerous sets of circumstances may be implemented by the intelligent host bus adapter of the present invention. For example, the failover mechanism may initiate failover actions (see step 470) under the following circumstances or operating conditions: (1) in a static load balancing environment, only when a preferred path is not aligned with an active controller; (2) whenever a link failure is detected; (3) when an active controller fails to respond; and (4) when a command timeout is received and concurrently path verification has failed. Preferably, the failover mechanism is configured to not initiate failover under a set of non-failover circumstances. In one embodiment, failover is not initiated when all active paths have failed and the following circumstances exist: (1) all other available paths have also failed; (2) standby path(s) has been marked as unusable because cache is not synchronized; and (3) standby path(s) has been marked as unusable because a standby controller is not responding during path verification.

The failover control process 400 then continues with the optional step 460 of applying load distribution. Once load distribution is applied, monitoring 410 is renewed as failover actions may no longer be required. However, in some embodiments, load distribution at 460 may be applied and then followed by failover actions. At 470, failover actions are performed by the failover mechanism in a manner that is transparent to the host (e.g., the host OS drivers). The failover actions performed are defined for each failover condition in a failover rule set (stored in or accessible by the host bus adapter). Monitoring 410 is then continued after the failover actions are completed.

Although not shown in process 400, failback is also controlled by the failover mechanisms of the host bus adapters. Generally, failback is also performed based on a set of failback rules stored in, programmed into, or accessible by the host bus adapters. For example, but not as a limitation, the failback rules may include the following: (1) failback if the controller in the preferred slot is replaced; (2) failback if the controller in the preferred slot is rebooted; (3) failback if a degraded or bad path transitions or changes to good or available; and (4) enforce anti-thrashing rules during failback.

With an overview of the operation of the failover mechanism understood, it may be useful to more fully discuss a number of device or system failures and how the mechanism operates to detect the failure (e.g., step 420), what conditions and circumstances may be required for that failure for failback to be initiated (e.g., steps 430 and 440), and what type of actions may be included in the rule set for performance by the failover mechanism. The following list of possible failures, conditions and circumstances, and failover actions is not intended to be limiting of the invention as those skilled in the art will be able to readily modify or add to this list. The following discussion is provided for fuller explanation of one useful embodiment of the invention.

Inter-controller link (ICL) down is one failure that may be detected by the failure mechanism. Detection is typically achieved by sensing redundant parameters and/or by receiving an event notification. The failure mechanism will verify circumstances are appropriate for failover and then check to see if conditions are also appropriate and if so, take matching failover actions. For example, if the conditions are that both active and standby controllers are operating or available, the failover mechanism logs the event to the host indicating the remote controller pair is no longer redundant. Additionally, caches such as the write and flush cache may be disabled. If the conditions are determined to be an active controller has failed and the standby controller is operable, the failover mechanism may take the failover action of failing-over to the standby controller (i.e., activating the standby controller). If the condition is that the active controller is operable but the standby controller failed, the mechanism may internally mark the path to the standby controller so as unusable path and then log the event to the host indicating the remote controller pair is no longer redundant. As can be seen, the predefined conditions must match existing conditions and further, the specific failover action taken is matched to or based on the identified condition.

Another failure that may be detected is the failure of the active controller. This problem is detected by a command timeout combined with a failure of a path verification command to the active controller. Detection may also be based on an event notification from the standby controller indicating ICL failure combined with failure of a path verification command to the active controller. The conditions that must be satisfied in one embodiment is that the standby controller is operable and the write cache is synchronized. The failover action in this embodiment is to activate the standby controller and resend all outstanding commands. The event is logged to the host indicating that the controller pair is no longer redundant.

The standby controller may also fail and this of detected by event notification from the active controller indicating ICL failure combined with failure of a path verification command to the standby controller. This failure can be used as an example of a situation where the condition set is empty, i.e., no conditions have to be met or identified prior to taking the failover actions. The failover actions include internally marking the path to the standby controller as unusable and then logging the event to the host indicating the remote controller pair is no longer redundant.

The active path may fail which is detected by a number of methods including a command timeout and path verification command timeout, a target logout from the loop or fabric, and a loop or fabric problem reported by the Fibre manager or Fabric control software. A condition that may be set for this failure is that the standby controller is operable and the write cache is synchronized. The failover actions taken when this condition is found include activating the standby controller, sending previously outstanding and timeout commands, and event notifying the host to indicate the active path failed and path is no longer redundant.

Another failure that may be monitored is failure of the standby path. This is also detected in a number of ways including a path verification command timeout, a target logout from the loop or fabric, and a loop or fabric problem reported by the Fibre manager or Fabric control software. As with failure of the standby controller, there may be no conditions set for this failure. The failover actions include marking the standby path of the redundant pair of paths as unusable and then event notification to the host indicating that the standby path failed and that the path is no longer redundant.

In general, the failover control process will not proceed to failover actions unless there is no available active path to access a target controller. The monitoring 410 continues on an ongoing or at least periodic basis to verify redundant controllers are operable and a path to the controller is available. In one embodiment, the monitoring 410 or failover control process 400 applies anti-thrashing rules when failing-over or failing back a controller or group of LUNs. Anti-thrashing is useful for avoiding ping-ponging that has been a problem in multi-initiator environments. Anti-thrashing can include setting a monitoring time or interval. For example, the monitoring time may be set at about 1 minute to 30 minutes or higher and only a set number of failovers and/or failbacks will be allowed by in the process 400 in the time interval. Typically, anti-thrashing rules are applied by LUN device or LUN group. The failover mechanism operates to hold an established failover path once a present number of failovers have occurred during the monitoring period (e.g., one, two, or more failovers per monitoring time). At the end of the monitoring interval, the anti-thrashing failover/failback counter and time counter are reset.

Although the invention has been described and illustrated with a certain degree of particularity, it is understood that the present disclosure has been made only by way of example and that numerous changes in the combination and arrangement of parts can be restored to by those skilled in the art without departing from the spirit and scope of the invention, as hereinafter claimed.

We claim:

1. A host bus adapter for managing failover and failback processes within a data storage system having a host server, a communication fabric, at least one active storage controller, and at least one standby storage controller, comprising:
   a connector linking the host bus adapter to a processor of the host server;
   a port linking the host bus adapter to the communication fabric configured for transmitting and receiving digital information; and
   a failover mechanism detecting a redundancy failure in the data storage system and in response, initiating failover actions,
   wherein the failover mechanism presents a single logical unit number (LUN) entity to operating system device drivers in the host processor that is discoverable a plurality of times and wherein the failover actions are initiated without prior communication with the host processor.

2. The host bus adapter of claim 1, wherein the failover actions are selected by the failover mechanism from a failover rule set.

3. The host bus adapter of claim 2, wherein the failover mechanism is further configured to determine at the time of the detecting, operating conditions within the data storage system, to determine whether the operating conditions match a set of failover conditions, and if matching, to select the failover action corresponding to the operating conditions.

4. The host bus adapter of claim 3, wherein the failover conditions are specific to the detected redundancy failure.

5. A data storage system with redundant data storage, comprising:
   a host computer device with a processor running operating system device drivers;
   a communication fabric for carrying digital data signals;
   an active controller controlling access by the host computer device to data storage devices;
   a standby controller controlling access by the host computer device to the data storage devices; and
   a host bus adapter linked to the host processor and the communication fabric for selecting a path through the communication fabric to one of the active and standby controllers for providing the operating system device drivers with access to the data storage devices,
   wherein the host bus adapter is configured to initiate a failover action selected from a set of failover actions, wherein the host bus adapter presents a single logical unit number (LUN) entity to each of the operating system device drivers that is discoverable multiple times.

6. The system of claim 5, wherein the host bus adapter detects a potential failure in redundancy and determines whether to initiate the failover action by determining whether failover operating circumstances and failover operating conditions for the potential failure are satisfied.

7. The system of claim 6, wherein the failover operating circumstances require when an active path in the communication fabric fails that at least one path to the controllers is available and that a path to the standby controller is usable.

8. The system of claim 6, wherein the initiated failover action is selected from the set of failover actions based on existing ones of the failover operating conditions.

9. The system of claim 5, wherein the data storage devices are grouped into subsets and wherein the host bus adapter is configured to perform the failover action for the subsets when a particular storage device within the subset requires the failover action.

10. The system of claim 5, wherein the host bus adapted is adapted to initiate failover actions for a particular one or group of the data storage devices less than a preset number of times per monitoring interval.

* * * * *

UNITED STATES PATENT AND TRADEMARK OFFICE
CERTIFICATE OF CORRECTION

| | | |
|---|---|---|
| PATENT NO. | : 7,111,084 B2 | Page 1 of 1 |
| APPLICATION NO. | : 10/035660 | |
| DATED | : September 19, 2006 | |
| INVENTOR(S) | : Choon-Seng Tan et al. | |

It is certified that error appears in the above-identified patent and that said Letters Patent is hereby corrected as shown below:

In column 12, line 57, in Claim 10, delete "adapted" and insert -- adapter --, therefor.

Signed and Sealed this
Twenty-seventh Day of September, 2011

David J. Kappos
*Director of the United States Patent and Trademark Office*